United States Patent [19]

Chu et al.

[11] Patent Number: 4,595,702

[45] Date of Patent: Jun. 17, 1986

[54] CONVERSION OF SYNTHESIS GAS TO LIQUID HYDROCARBONS

[75] Inventors: Yung F. Chu; James A. Brennan; Arthur W. Chester, all of Cherry Hill, N.J.

[73] Assignee: Mobil Oil Corporation, New York, N.Y.

[21] Appl. No.: 719,592

[22] Filed: Apr. 3, 1985

Related U.S. Application Data

[63] Continuation-in-part of Ser. No. 572,479, Jan. 20, 1984, abandoned.

[51] Int. Cl.[4] .................................................. C07C 1/04
[52] U.S. Cl. .................................... 518/713; 518/717; 502/74; 502/66
[58] Field of Search ............... 518/713, 717, 719, 720, 518/721

[56] References Cited

U.S. PATENT DOCUMENTS

| | | | |
|---|---|---|---|
| 4,086,262 | 4/1978 | Chang et al. | 518/719 |
| 4,159,995 | 7/1979 | Haag et al. | 518/717 |
| 4,172,843 | 10/1979 | Dwyer et al. | 518/717 |
| 4,207,208 | 6/1980 | Lucki et al. | 518/719 |
| 4,207,250 | 6/1980 | Butter et al. | 518/719 |
| 4,255,349 | 3/1981 | Butter et al. | 518/719 |
| 4,298,695 | 11/1981 | Butter et al. | 518/720 |
| 4,304,871 | 12/1981 | Brennan et al. | 518/715 |
| 4,403,044 | 9/1983 | Post et al. | 518/713 |

*Primary Examiner*—Howard T. Mars
*Attorney, Agent, or Firm*—Alexander J. McKillop; Michael G. Gilman; Dennis P. Santini

[57] ABSTRACT

This invention provides a process for converting synthesis gas to hydrocarbon fuels in the $C_5$–$C_{24}$ (gasoline and distillate) range. The conversion proceeds with minimal formation of by-product fractions. The conversion is accomplished with a low nitrogen content iron catalyst intimately mixed with a selected zeolite.

24 Claims, No Drawings

CONVERSION OF SYNTHESIS GAS TO LIQUID HYDROCARBONS

CROSS REFERENCE TO RELATED APPLICATION

This is a continuation-in-part of application Ser. No. 572,479, filed Jan. 20, 1984 now abandoned.

FIELD OF THE INVENTION

This invention is concerned with the conversion of synthesis gas, i.e. mixtures of gaseous carbon oxide with hydrogen or hydrogen donors, to hydrocarbon mixtures. In one aspect, it is concerned with a precipitated iron catalyst modified with zeolite that is selective for liquid hydrocarbons. In another aspect, it is concerned with an improved process for converting synthesis gas to liquid hydrocarbon fuels.

BACKGROUND OF THE INVENTION

Processes for the conversion of coal and other hydrocarbons such as natural gas to a gaseous mixture consisting essentially of hydrogen and carbon monoxide, or of hydrogen and carbon dioxide, or of hydrogen and carbon monoxide and carbon dioxide, are well known. Although various processes may be employed for the gasification, those of major importance depend either on the partial combustion of the fuel with an oxygen-containing gas or on the high temperature reaction of the fuel with steam, or on a combination of these two reactions. An excellent summary of the art of gas manufacture is given in Encyclopedia of Chemical Technology, Edited by Kirk-Othmer, Second Edition, Volume 10, pages 353–433, (1966), Interscience Publishers, New York, N.Y., the contents of which are herein incorporated by reference. The techniques for gasification of coal or other solid, liquid or gaseous fuel are not considered to be per se inventive here.

It is also well known that synthesis gas will undergo conversion to reduction products of carbon monoxide, such as hydrocarbons, at from about 300° F. to about 850° F., under from about one to one thousand atmospheres pressure, over a fairly wide variety of catalysts. The Fischer-Tropsch process, for example, which has been most extensively studied, produces a range of liquid hydrocarbons, a portion of which have been used as low octane gasoline. Catalysts that have been studied for this and related processes include those based on iron, cobalt, nickel, ruthenium, thorium, rhodium and osmium, or their oxides.

As can well be appreciated, the patent and technical literature relating to the Fischer-Tropsch process, is, indeed, extensive and the various catalysts reported in the prior art have been used by themselves as well as in admixture with catalytically inactive supports such as kieselguhr. Although the reasons for using catalytically inactive supports have varied, nevertheless, it would appear that one reason for using the same was that it resulted in increased surface area of the Fischer-Tropsch component upon which it was deposited or admixed and that it also aided in controlling the heat requirements of the overall exothermic reactions.

The wide range of catalysts and catalyst modifications disclosed in the art and an equally wide range of conversion conditions for the reduction of carbon monoxide by hydrogen provide flexibility toward obtaining selected boiling-range products. Nonetheless, these conversions still leave much to be desired because either the catalyst is costly or by-products are produced in excessive amount. A review of the status of this art is given in "Carbon Monoxide-Hydrogen Reactions", Encyclopedia of Chemical Technology, Edited by Kirk-Othmer, Second Edition, Volume 4, pp. 446–488, Interscience Publishers, New York, N.Y., the text of which is incorporated herein by reference.

Iron catalysts have been extensively studied and used in the Fischer-Tropsch process. In general, they are inexpensive and exhibit good activity, and they contain potassium promoter which serves to control the amount of methane plus ethane by-product. The molecular weight distribution of the product is controlled to a great extent by the nature of the reaction, and it has come to be recognized that this follows the Schulz-Flory distribution. See, e.g., P. Biloen and W. M. H. Sachtler, *Advance in Catalysis, Vol.* 30, pp. 169–171 (Academic Press, New York, N.Y., 1981), which is herein incorporated by reference. Thus, reduction of the methane plus ethane make, designated herein also as the $C_1+C_2°$ by-product, although desirable for increasing the total liquid yield, still leaves unsolved the problem of how to increase the amount of liquid product in the boiling range of gasoline and diesel fuel, for example. In recent years it has become known to modify the Fischer-Tropsch liquid products by the conjoint use of a zeolite catalyst exemplified by HZSM-5 and modifications thereof. U.S. Pat. No. 4,086,262 to Chang et al describes the method wherein an intimate mixture of an inorganic carbon monoxide reduction catalyst and certain acidic crystalline aluminosilicate is used as catalyst for producing hydrocarbons from synthesis gas. The two components may be contained in the same or in different catalyst particles. The entire content of this patent is incorporated herein by reference as if fully set forth.

Although the patent just described represents a distinct advance in control of both product distribution and the nature of the products obtained with iron catalysts, the potassium promoter and other constituents such as nitrogen compounds that may be present in the conventional iron catalyst tend to interact with the zeolite in such a manner as to reduce the effectiveness of the catalytic mixture.

It is an object of this invention to provide a novel intimate mixture of an inorganic, potassium promoted, precipitated iron catalyst and a selected zeolite, which mixture is highly selective for liquid fuel products. It is a further object to provide a zeolite-modified Fischer-Tropsch type catalyst that has a low content of nitrogen. It is a still further object to provide an improved process for the conversion of synthesis gas to gasoline distillate fuel in the diesel boiling range. These and other objects of this invention will become evident to one skilled in the art on reading this entire specification including the appended claims.

BRIEF SUMMARY OF THE INVENTION

It has now been found that an intimate mixture of a low nitrogen content, potassium promoted, precipitated Fischer-Tropsch type iron catalyst and a crystalline zeolite selected, for example, from the group consisting of ZSM-5, ZSM-5/ZSM-11 intermediate, ZSM-11, ZSM-12, ZSM-22, ZSM-23, ZSM-35, ZSM-38, ZSM-45, ZSM-48, and zeolite Beta provides a catalyst with unusual selectivity for converting synthesis gas to hydrocarbons in the boiling range of gasoline and diesel fuel. Furthermore, this is accomplished in a synthesis gas conversion process operated in the temperature range of about 430° to 560° F. with formation of not more than 12 wt % of $C_1+C_2°$ by-product, all as more fully described hereinbelow.

The advantageous selectivity for desirable liquid hydrocarbon products together with low make of by-product methane and ethane are characteristic of the novel catalyst of this invention.

PREPARATION OF IRON COMPONENT

Conventional techniques for the production of an iron precipitation catalyst in large quantity and its activation prior to use are described by H. Koebel and M. Ralek, Catalysis Review-Sci. Eng. (1980) *Volume* 21, pp. 242–249, the entire content of which is incorporated herein by reference as if fully set forth.

The initial steps in the preparation of the precipitated inorganic iron catalyst useful in this invention are conventional. Ferric nitrate, which may be obtained by dissolving wrought iron scrap or steel turnings in nitric acid or, alternatively, from another source, is dissolved in water. The solution should be adjusted, if necessary, so that it contains a predetermined small amount of copper. The iron is then precipitated with ammonia or ammonium carbonate. Potassium carbonate is then added to the filtered and washed precipitate to provide a content of 0.1 to about 1.0 wt % potassium carbonate based on iron. The preferred potassium carbonate level is about 0.6 wt %.

The filter cake produced by the technique just described and followed by the conventional step of calcining in air at e.g. 572° F., usually contains well in excess of 1000 ppm (parts per million) of nitrogen. Such material is unsuited for use as the iron component in the present invention, which requires an iron catalyst having a nitrogen content less than 200 ppm, preferably less than 100 ppm, and most preferably less than about 50 ppm.

There are at least two ways to prepare such a low nitrogen content iron catalyst.

The first method requires that the ammonia solution and the ferric nitrate solution be brought together at controlled rates such that the pH of the cooled supernatant liquid containing the precipitated catalyst is maintained at about 6.8. The filter cake produced by this method is then washed with hot water until relatively free of nitrate ion. The resulting calcined filter cake produced by this technique is of low nitrogen content.

A second technique, in which precipitation is effected at a pH other than about 6.8, such as a pH of 6.0, is to treat the washed and dried filter cake with hydrogen gas at about 390° to 450° F. until no further exothermic effect is observed. To avoid excessive temperature excursions, the hydrogen is diluted with nitrogen. The treatment is started with a hydrogen:nitrogen ratio of 1:10, and the hydrogen content slowly increased as the tendency for the temperature in the hot zone to exceed 450° F. diminishes.

Both of the above techniques are capable of yielding a low nitrogen content iron component, with nitrogen content less than about 50 ppm, as illustrated later by example. Regardless of how prepared, it is preferred for purposes of this invention to calcine the iron catalyst at a temperature below 650° F.

Also useful in this invention is the low nitrogen content precipitated iron catalyst calcined at 700° to 1200° F., described in U.S. application Ser. No. 572,479, the contents of which are incorporated herein by reference.

The method used for preparing the iron component per se is not considered part of the present invention. One such method and the process of using it as a separate bed with a zeolite is disclosed in U.S. application Ser. No. 384,693, filed June 3, 1982.

PREPARATION OF CONVERSION CATALYST

The conversion catalyst of this invention comprises an intimate physical mixture of the low nitrogen content precipitated iron catalyst as one essential component and a suitable crystalline zeolite as the second essential component. The proportions of the two essential components depend on the particular zeolite chosen. In general, from as little as two parts to as much as 49 parts by weight of zeolite may be used per 100 parts by weight of iron catalyst, depending on the activity of the zeolite as determined by its "alpha value". In the foregoing proportions, the amounts of zeolite refer to the crystalline zeolitic component per se, exclusive of binder if any be present.

An effective intimate physical mixture for purposes of the present invention is provided by ball-milling for a short time the less than 8 mesh iron component together with the zeolite crystals and forming pellets from mixture so formed. Because of its observed effectiveness, the intimate mixture in the form of single particles all of which contain both essential components is preferred. Variations which are effective also are contemplated as within the scope of this invention. One such variation, for example, is to combine the milled mixture described above with binder and to form extrudate consisting of single particles. The term "physical mixture" as used herein means a mixture of preformed iron catalyst with preformed zeolite; it is intended to exclude a catalyst in which the iron catalyst is precipitated in the presence of the zeolite.

Another effective intimate physical mixture may be provided as separate particles, each of which contains either the iron or the zeolite component.

The zeolite useful as the second essential component in the present invention is selected from, for example, the group consisting of ZSM-5, ZSM-11, ZSM-5/ZSM-11 intermediate, ZSM-12, ZSM-22, ZSM-23, ZSM-35, ZSM-38, ZSM-45, ZSM-48, and zeolite Beta. All except ZSM-45 and Beta may be referred to as intermediate pore size zeolites. Zeolite Beta has properties of intermediate pore size zeolites but is actually between large pore and intermediate pore, as defined below, in structure.

The intermediate pore size zeolites above, for convenience hereinafter referred to as "ZSM-5 type" zeolites, are members of a novel class of zeolites that exhibit unusual properties. Although these zeolites have unusually low alumina contents, i.e. high silica to alumina ratios, they are very active even when the silica to alumina ratio exceeds 30. The activity is surprising since catalytic activity is generally attributed to framework aluminum atoms and/or cations associated with these aluminum atoms. These zeolites retain their crystallinity for long periods in spite of the presence of steam at high temperature which induces irreversible collapse of the framework of other zeolites, e.g. of the X and A type. Furthermore, carbonaceous deposits, when formed, may be removed by burning at higher than usual temperatures to restore activity. These zeolites, used as catalysts or components of catalysts generally have low coke-forming activity and therefore are conducive to long times on stream between regenerations by burning with oxygen-containing gas such as air. This type zeolite has a silica to alumina ratio of at least 12.

U.S. Pat. No. 3,702,886 describing and claiming ZSM-5 is incorporated herein by reference.

ZSM-11 is more particularly described in U.S. Pat. No. 3,709,979, the entire content of which is incorporated herein by reference.

ZSM-5/ZSM-11 intermediate is described in U.S. Pat. No. 4,229,424, the entire content of which is incorporated herein by reference.

ZSM-12 is more particularly described in U.S. Pat. No. 3,832,449, the entire content of which is incorporated herein by reference.

ZSM-23 is more particularly described in U.S. Pat. No. 4,076,842, the entire content of which is incorporated herein by reference.

ZSM-35 is more particularly described in U.S. Pat. No. 4,016,245, the entire content of which is incorporated herein by reference.

ZSM-38 is more particulary described in U.S. Pat. No. 4,046,859, the entire content of which is incorporated herein by reference.

ZSM-48 is described in U.S. Pat. No. 4,397,827, the entire content of which is incorporated herein by reference.

Such zeolites, when prepared in the presence of organic cations, are substantially catalytically inactive, possibly because the intra-crystalline free space is occupied by organic cations from the forming solution. They may be activated by heating in an inert atmosphere at 1000° F. for one hour, for example, followed by base exchange with ammonium salts followed by calcination at 1000° F. in air. The presence of organic cations in the forming solution may not be absolutely essential to the formation of this type zeolite; however, the presence of these cations does appear to favor the formation of this special class. More generally, it is desirable to activate this type catalyst by base exchange with ammonium salts followed by calcination in air at about 1000° F. for from about 15 minutes to about 24 hours. This activated form of the zeolite is commonly referred to as the hydrogen form, and this form is designated herein by the prefix "H", e.g. HZSM-5, HZSM-11, etc., which is intended to imply that at least 50% and preferably at least 75% of the cationic sites are associated with hydrogen ions.

Other zeolites useful in the present invention include ZSM-22, ZSM-45 and Beta.

ZSM-22 is described in U.S. Pat. application Ser. No. 373,541 filed April 30, 1982, the entire content of which is incorporated herein by reference.

ZSM-45 is more particularly described in U.S. Pat. application Ser. No. 425,019 filed Sept. 27, 1982, the entire content of which is incorporated herein by reference.

Zeolite Beta is more particularly described in U.S. Pat. No. 3,308,069 to Wadlinger et al., the entire content of which is incorporated herein by reference.

When synthesized in the alkali metal form, the zeolite is conveniently converted to the hydrogen form, generally by intermediate formation of the ammonium form as a result of ammonium ion exchange and calcination of the ammonium form to yield the hydrogen form. In addition to the hydrogen form, other forms of the zeolite wherein the original alkali metal has been reduced to less than about 1.5 percent by weight may be used.

Thus, the original alkali metal of the zeolite may be replaced in part by ion exchange with other suitable metal cations of Groups I through VIII of the Periodic Table, including, by way of example, nickel, copper, zinc, calcium or rare earth metals, or a platinum group metal such as platinum.

In the process of this invention, it may be desirable to incorporate the above-described crystalline aluminosilicate zeolite in another material resistant to the temperature and other conditions employed in the process. Such matrix materials include synthetic or naturally occuring substances as well as inorganic materials such as clay, silica and/or metal oxides. The latter may be either naturally occurring or in the form of gelatinous precipitates or gels including mixtures of silica and metal oxides. Naturally occurring clays which can be composited with the zeolite include those of the montmorillonite and kaolin families, which families include the sub-bentonites and the kaolins commonly known as Dixie, McNamee-Georgia and Florida clays or others in which the main mineral constituent is halloysite, kaolinite, dickite, nacrite or anauxite. Such clays can be used in the raw state as originally mined or initially subjected to calcination, acid treatment or chemical modification.

In addition to the foregoing materials, the zeolites employed herein may be composited with a porous matrix material, such as alumina, silica-alumina, silica-magnesia, silica-zirconia, silica-thoria, silica-berylia, silica-titania as well as ternary compositions, such as silica-alumina-thoria, silica-alumina-zirconia, silica-alumina-magnesia and silica-magnesia-zirconia. The matrix may be in the form of a cogel. The relative proportions of zeolite component and inorganic oxide gel matrix on an anhydrous basis may vary widely with the zeolite content ranging from between about 5 to about 99 percent by weight and more usually in the range of about 20 to about 80 percent by weight of the dry composite.

It is sometimes advantageous to steam the zeolite component, prior to forming the intimate mixture of this invention, to reduce its alpha value by 10% or more. Methods of steaming and measurement of the alpha value are known to those skilled in the art and need not be repeated here.

CONVERSION PROCESS

The conversion process of this invention utilizes as catalyst the above-described intimate mixture of low nitrogen content precipitated iron catalyst and particular zeolite. In its preferred form, the catalyst is provided as single particles of uniform composition, i.e. each particle contains both essential components.

A fixed bed or fluid bed reactor may be used. In either case, as with the conventional Fischer-Tropsch catalyst, if ferric iron is present, it must be converted to the metallic bonding state (activated) before the catalyst is put to use by methods known to those skilled in the art.

Synthesis gas is then contacted with the catalyst at a temperature of about 430° to about 560° F. Other reaction conditions include a gas hourly space velocity (GHSV) of 50 to 1500 volumes of synthesis gas per volume of catalyst per hour, and a pressure of 100 to 1000 psig (pounds per square inch gauge). The conversion is conducted under a combination of conditions effective for producing a hydrocarbon mixture that contains at least 70 wt % of total hydrocarbons in the boiling range of gasoline and distillate, with less than 12 wt % of total hydrocarbons as $C_1+C_2°$ by-product. The combined boiling range of gasoline and distillate, as used herein, corresponds to the distillation fraction that contains the $C_5-C_{24}$ hydrocarbon fraction as determined by ASTM method D-86. Those skilled in the art will recognize that not all combinations of the conditions specified above need produce for every catalyst the high selectivity specified for $C_5-C_{24}$ boiling range material. Generally, a reduction of operating temperature will correct the deficiency, although in some instances an adjustment of pressure or space velocity may be more advantageous. Lower temperatures in the range of 430° F. to about 510° F. are preferred to increase the yield of distillate boiling range material.

EXAMPLES

This invention will now be illustrated by examples, which are not to be construed as limiting the scope of this invention. All parts and proportions are by weight unless explicitly stated to be otherwise.

EXAMPLE 1

Twenty one kilograms of $Fe(NO_3)_3.9H_2O$ was dissolved in 53 liters of distilled water and the solution heated to 175° F. To this solution was added 25 grams of $Cu(NO_3)_2.2.5H_2O$ in 250 ml of distilled water. A separate solution was prepared by adding 12,375 grams of 29.6% of $NH_3$ to 297 pounds of deionized water.

The two solutions were brought together hot, at a temperature of about 190°–210° F. with the use of a preheater and mixing nozzle, and passed to a continuous mixer, then to a stainless heat exchanger, an in-line mixer, and finally a vacuum filter. The pH of the cooled suspension was monitored at the in-line mixer and the rate of pumping of the ammonia solution was adjusted as needed during the entire operation to maintain the pH at 6.8. The wet cake was washed with more than 64 gallons of hot water at 95° C. until the filtrate gave a negative diphenylamine test for nitrate ion. The procedure yielded 74.1 pounds of wet cake with a solids content of 11.64 wt %. To this wet cake was added uniformly 2025 ml of $K_2CO_3$ solution containing 8 grams of $K_2CO_3$ per liter.

The wet cake was dried at 230° F. The yield was 4,027 grams. The dried cake was crushed to less than 8 mesh particles and calcined for 6 hours at 572° F. in a stream of air flowing at 40 liters per minute.

The calcined catalyst contained 0.3 wt % copper and 0.6 wt % $K_2CO_3$ based on iron. It contained less than 50 ppm of nitrogen.

One part of HZSM-5 having a silica to alumina ratio of 70:1, steamed to an alpha value of 120, was mixed with 12.5 parts of the calcined low nitrogen catalyst. The mixture was pelleted to form the conversion catalyst.

EXAMPLE 2

The conversion catalyst of Example 1 was loaded into a fixed-bed reactor and activated with a mixture of carbon monoxide and hydrogen. Then a synthesis gas mixture having a whole ratio of hydrogen to carbon monoxide of 0.68 was passed over the catalyst under the two sets of conditions shown in Table I. The results are summarized in that same table. 77 to 79 wt % of the syngas converted formed products in the $C_5-C_{24}$ boiling range, with only 5 to 7 wt % formation of $C_1+C_2°$ by-product.

EXAMPLE 3

A solution of 57.4 kilograms of $Fe(NO_3)_3.9H_2O$ in 156 liters of distilled water heated to 175° F. was mixed with a solution of 890 grams of $Cu(NO_3)_2.3N_2O$ in 5200 cc of distilled water. A separate solution consisting of 130 liters 2.5 wt % $NH_3$ in deionized water was prepared.

The two solutions were mixed as described in Example 1 except that the pH was controlled at 6.0 instead of 6.8, and the filter cake was washed with 150 gallons of water. Potassium carbonate was added as a solution that contained 13 grams per liter, enough being used to provide 0.6 wt % $K_2CO_3$ based on iron. The filter cake was dried 24-48 hours at 250° F. and crushed to less than 8 mesh.

To reduce the nitrogen content of the catalyst, it was loaded into a reactor and subjected to treatment with hydrogen as follows. Pure nitrogen was passed through the bed and the temperature of the bed increased to about 390° F. Hydrogen was then added to the nitrogen in an amount adjusted to keep the peak temperature of the bed below 450° F. The treatment was terminated when no further exotherm was evident.

The hydrogen treated catalyst contained 3.0 wt % copper and 0.6 wt % $K_2CO_3$ based on iron. It had a nitrogen content below 50 ppm.

Ten parts of the iron catalyst prepared above was mixed with four parts of HZSM-45 having a silica to alumina ratio of 17:1 and steamed to an alpha value of 22. The intimate mixture was pelleted to form the conversion catalyst.

EXAMPLE 4

The conversion catalyst of Example 3 was loaded into a fixed bed reactor. It was activated and used to convert the same synthesis gas mixture as described in Example 2, under three sets of conditions. The conditions and results are summarized in Table 1.

At least 70 wt % of the converted synthesis gas formed liquid hydrocarbons boiling in the $C_5$ to $C_{24}$ range, with less than 10 wt % of $C_1+C_2°$ by-product having been formed.

EXAMPLE 5

A conversion catalyst was prepared by mixing a portion of the iron catalyst prepared in Example 1 with zeolite Beta having a silica to alumina ratio of 40:1 and steamed to an alpha value of 120 in the hydrogen form. The zeolite contained 0.6 wt % platinum. The mixture was pelleted to form the conversion catalyst. The iron component and zeolite were present in the ratio 25 to 1 (one).

The conversion catalyst was loaded, pretreated and evaluated as described in Example 4. The results for two sets of conversion conditions are shown in Table I. At 540° F., 75 wt % of $C_5-C_{24}$ hydrocarbons are formed, but increasing the temperature to 600° F. causes this yield to drop to only 54%.

EXAMPLE 6

This example is not considered within the scope of this invention, and is added merely to demonstrate the advantageous result obtained by incorporating zeolite as taught herein with the conversion catalyst.

A portion of the iron catalyst prepared in Example 1 was pelleted and evaluated at 490° F. in the same manner as was the conversion catalyst prepared in Example 2. The results in Table 1 show that only 51 wt % of the converted product is $C_5-C_{24}$ hydrocarbons without the zeolite, whereas 79 wt % of such product is formed with the zeolite component present.

TABLE I

| Example | 2 | | 4 | | | 5 | | 6 |
|---|---|---|---|---|---|---|---|---|
| Temp., °F. | 490 | 540 | 490 | 490 | 520 | 540 | 600 | 490 |
| Pressure, psig | 200 | 200 | 200 | 200 | 200 | 200 | 200 | 200 |
| GHSV | 350 | 350 | 260 | 480 | 480 | 370 | 370 | 350 |
| TOS, Hrs. | 27 | 96 | 27 | 70 | 142 | 124 | 52 | — |
| $H_2/CO$ | 93 | 91 | 93 | 78 | 87 | 88 | 91 | 90 |
| Conversions (mol %) | | | | | | | | |
| Hydrocarbon Selectivity (wt %) | | | | | | | | |
| $C_1 + C_2$ | 7 | 5 | 8 | 7 | 9 | 9 | 8 | 9 |
| $C_2-C_4$ (olefins) | 10 | 9 | 7 | 7 | 12 | 6 | 22 | — |
| $C_3-C_4$* | 2 | 2 | 2 | 2 | 3 | 5 | 11 | 18 |
| $C_5-C_9$** | 33 | 48 | 26 | 29 | 37 | 39 | 27 | 26 |
| $C_{10}-C_{24}$*** | 46 | 29 | 48 | 43 | 33 | 36 | 27 | 25 |
| $C_{25}+$ | 2 | 7 | 8 | 12 | 6 | 5 | 4 | 22 |
| Total $C_5-C_{24}$ | 79 | 77 | 74 | 72 | 70 | 75 | 54 | 51 |

*(paraffins)
**(olefinic gasoline)
***(distillate)

What is claimed is:

1. In a process for converting synthesis gas to liquid hydrocarbon fuels, said process comprising contacting said synthesis gas with a catalyst comprising an intimate mixture of a potassium promoted, precipitated, inorganic iron catalyst containing copper and a crystalline zeolite selected from the group consisting of ZSM-5 type, ZSM-45 and Beta under a combination of conditions effective for converting said synthesis gas to at least 70 wt % of liquid products in the $C_5$ to $C_{24}$ boiling range with not more than 12 wt % of $C_1+C_2°$ by-product, and recovering said liquid products; the improvements comprising said inorganic iron catalyst containing less than 200 ppm nitrogen and said contacting being conducted under a temperature of from about 430° F. to about 510° F.

2. The process described in claim 1 wherein said mixture is provided as single particles each of which contains both said iron catalyst and said zeolite.

3. The process described in claim 1 wherein said zeolite is in the hydrogen form.

4. The process described in claim 1 wherein said zeolite is ZSM-5.

5. The process described in claim 1 wherein said zeolite is ZSM-45.

6. The process described in claim 1 wherein said zeolite is zeolite Beta.

7. The process described in claim 2 wherein said zeolite is ZSM-5.

8. The process described in claim 2 wherein said zeolite is ZSM-45.

9. The process described in claim 2 wherein said zeolite is Beta.

10. The process described in claim 2 wherein said zeolite is in the hydrogen form.

11. The process described in claim 1 wherein said intimate mixture consists of separate particles each of which contains either the iron component or the zeolite component.

12. The process described in claim 11 wherein said zeolite is in the hydrogen form.

13. The process described in claim 11 wherein said zeolite is ZSM-5.

14. The process described in claim 11 wherein said zeolite is ZSM-45.

15. The process described in claim 11 wherein said zeolite is Beta.

16. The process described in claim 1 wherein said iron catalyst is an iron catalyst calcined at a temperature below 650° F.

17. The process described in claim 2 wherein said iron catalyst is an iron catalyst calcined at a temperature below 650° F.

18. The process described in claim 3 wherein said iron catalyst is an iron catalyst calcined at a temperature below 650° F.

19. The process described in claim 4 wherein said iron catalyst is an iron catalyst calcined at a temperature below 650° F.

20. The process described in claim 5 wherein said iron catalyst is an iron catalyst calcined at a temperature below 650° F.

21. The process described in claim 6 wherein said iron catalyst is an iron catalyst calcined at a temperature below 650° F.

22. The process described in claim 11 wherein said iron catalyst is an iron catalyst calcined at a temperature below 650° F.

23. The process described in claim 12 wherein said iron catalyst is an iron catalyst calcined at a temperature below 650° F.

24. The process described in claim 13 wherein said iron catalyst is an iron catalyst calcined at a temperature below 650° F.

* * * * *

UNITED STATES PATENT AND TRADEMARK OFFICE
CERTIFICATE OF CORRECTION

PATENT NO. : 4,595,702
DATED : June 17, 1986
INVENTOR(S) : Yung F. Chu, James H. Brennan, Arthur W. Chester It is certified that error appears in the above-identified patent and that said Letters Patent is hereby corrected as shown below:

Column 7, line 62, "whole" should be -- molar --.

Signed and Sealed this

Twenty-third Day of December, 1986

Attest:

DONALD J. QUIGG

Attesting Officer      Commissioner of Patents and Trademarks